United States Patent
Lee

(10) Patent No.: US 10,802,653 B2
(45) Date of Patent: Oct. 13, 2020

(54) TOUCH TYPE DISPLAY DEVICE AND METHOD FOR SENSING TOUCH THEREOF

(71) Applicant: LG Display Co., Ltd., Seoul (KR)

(72) Inventor: Tae-Ho Lee, Paju-si (KR)

(73) Assignee: LG Display Co., LTD., Seoul (KR)

( * ) Notice: Subject to any disclaimer, the term of this patent is extended or adjusted under 35 U.S.C. 154(b) by 15 days.

(21) Appl. No.: 16/038,605

(22) Filed: Jul. 18, 2018

(65) Prior Publication Data

US 2019/0025957 A1    Jan. 24, 2019

(30) Foreign Application Priority Data

Jul. 21, 2017   (KR) ........................ 10-2017-0092763

(51) Int. Cl.
*G06F 3/044* (2006.01)
*G06F 3/041* (2006.01)
*G06F 3/0354* (2013.01)
*G06F 1/16* (2006.01)

(52) U.S. Cl.
CPC ............ *G06F 3/044* (2013.01); *G06F 1/1637* (2013.01); *G06F 1/1643* (2013.01); *G06F 3/03547* (2013.01); *G06F 3/0414* (2013.01); *G06F 3/0416* (2013.01); *G06F 2203/04103* (2013.01); *G06F 2203/04105* (2013.01)

(58) Field of Classification Search
CPC . G06F 2203/04103; G06F 2203/04105; G06F 3/03547; G06F 3/0414; G06F 3/0416; G06F 3/044; G06F 1/1637; G06F 1/1643
See application file for complete search history.

(56) References Cited

U.S. PATENT DOCUMENTS

| | | | | |
|---|---|---|---|---|
| 2011/0134053 A1* | 6/2011 | Kao | ...................... | G06F 3/0412 345/173 |
| 2015/0160759 A1* | 6/2015 | Lien | ........................ | G06F 3/044 345/174 |
| 2016/0147375 A1* | 5/2016 | Bok | ....................... | G06F 3/0421 345/175 |
| 2016/0231852 A1* | 8/2016 | Moon | ...................... | G06F 3/044 |
| 2017/0249030 A1* | 8/2017 | Park | ........................ | G06F 3/044 |
| 2017/0249049 A1* | 8/2017 | Wang | ..................... | G06F 3/0412 |
| 2017/0344149 A1* | 11/2017 | Ramakrishnan | ........ | G06F 3/044 |
| 2018/0260051 A1* | 9/2018 | Kim | ........................ | G06F 3/044 |

FOREIGN PATENT DOCUMENTS

WO    WO-2017074107 A1 *   5/2017   ............. G06F 3/044

* cited by examiner

*Primary Examiner* — Hong Zhou

(74) *Attorney, Agent, or Firm* — Morgan, Lewis & Bockius LLP

(57) ABSTRACT

A touch type display device includes a display panel which includes a first touch electrode, and a second touch electrode including a plurality of sensing pads located outside the display panel, wherein an area of each of the plurality of sensing pads is proportional to an interval between the first touch electrode and each of the plurality of sensing pads.

10 Claims, 9 Drawing Sheets

FIG. 9A
| Region | G0[um] | K [um²] | C1[count] | K1[um²] | GB [um] | C2[count] | GF [um] | GBF [um] |
|---|---|---|---|---|---|---|---|---|
| A4 | 740 | 20000 | 17712 | 20000 | 740 | 27712 | 473 | 267 |
| A3 | 700 | 20000 | 18725 | 20000 | 700 | 28725 | 456 | 244 |
| A2 | 660 | 20000 | 19859 | 20000 | 660 | 29859 | 439 | 221 |
| A1 | 620 | 20000 | 21141 | 20000 | 620 | 31141 | 421 | 199 |
FIG. 9B
| Region | G0[um] | K [um²] | C1[count] | K1[um²] | GB [um] | C2[count] | GF [um] | GBF [um] |
|---|---|---|---|---|---|---|---|---|
| A4 | 740 | 23000 | 20369 | 21135 | 680 | 30369 | 456 | 224 |
| A3 | 700 | 22000 | 20597 | 21371 | 680 | 30597 | 458 | 222 |
| A2 | 660 | 21000 | 20852 | 21636 | 680 | 30852 | 460 | 220 |
| A1 | 620 | 19000 | 20084 | 20839 | 680 | 30084 | 454 | 226 |
FIG. 10A
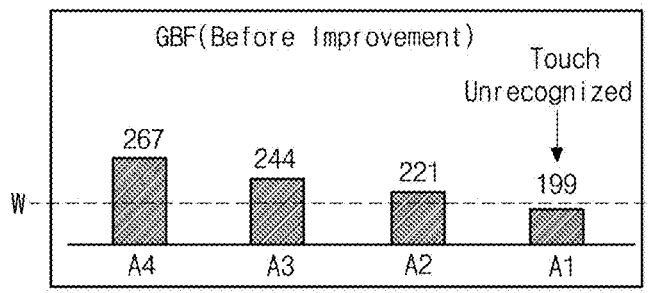
FIG. 10B
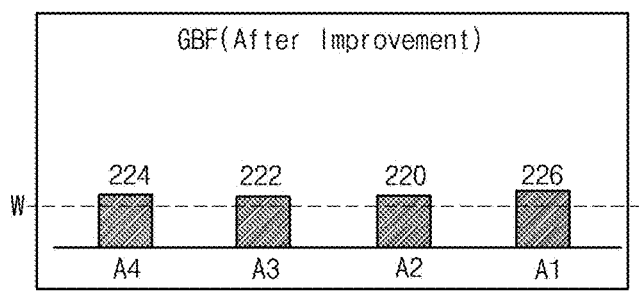

TOUCH TYPE DISPLAY DEVICE AND METHOD FOR SENSING TOUCH THEREOF

CROSS-REFERENCE TO RELATED APPLICATIONS

This application claims the benefit under 35 U.S.C. § 119(a) of Korean Patent Application No. 10-2017-0092763, filed on Jul. 21, 2017, in the Korean Intellectual Property Office, which is incorporated herein by reference in its entirety.

BACKGROUND

1. Technical Field

The present disclosure relates to a touch type display device, and more particularly, to a touch type display device in which touch sensitivity is improved by setting an area of a sensing pad to be different according to an interval between a first touch electrode and a second touch electrode, and a method of sensing a touch.

2. Discussion of the Related Art

The display field has been rapidly developed in line with the information age. In response to this, liquid crystal display (LCD) devices, organic light-emitting diode (OLED) display devices, and the like have been developed and widely used as flat panel display (FPD) devices having advantages in thinness, being lightweight, and low power consumption.

Recently, touch type display devices formed by attaching a touch panel onto display panels of such display devices have been spotlighted.

A touch type display device, which is also referred to as a touch screen, is used as an output unit for displaying an image and is also used as an input unit for inputting a user's command by touching a specific portion of a displayed image. That is, when the user touches a touch panel while viewing an image displayed on a display panel, the touch panel may detect position information of a corresponding touch portion and compare the detected position information with position information of the image to recognize the user's command.

The touch panels of the touch type display devices may be divided into resistive type touch panels, capacitive type touch panels, infrared type touch panels, surface acoustic wave type touch panels, and the like according to a method of detecting position information.

Among these touch panels, the capacitive type touch panels are more durable, have a long lifetime, easily support multi-touch, and provide high light transmittance, as compared with other touch panels. Therefore, the capacitive type touch panels are widely in use.

The capacitive type touch panels may be divided into mutual capacitive type touch panels, in which a transmission wiring and a reception wiring are independently formed and a change in capacitance between the transmission wiring and the reception wiring according to a touch, and self-capacitive type touch panels, in which a voltage is applied to an independent touch electrode in each region and a change in capacitance of the touch electrode according to a touch.

A touch type display device including a touch panel may be manufactured in such a manner that a separate touch panel is attached to a display panel or the touch panel is integrally formed on a substrate of the display panel.

The conventional touch type display devices are limited to two-dimensional (2D) touch interaction because the conventional touch type display devices recognize touch coordinates, that is, an X-axis coordinate and a Y-axis coordinate, in a planar surface thereof.

In order to overcome the limitation of the conventional 2D touch interaction, a touch force recognition technique for recognizing a touch force (a Z-axis coordinate) using a force touch sensor is being proposed.

FIGS. 1A and 1B are schematic cross-sectional views showing a force touch type display device according to the related art.

As shown in FIGS. 1A and 1B, a force touch type display device 1 includes a touch driving electrode E1 (a transceiver: Tx) formed on a display panel 10 and a touch sensing electrode E2 (a receiver: Rx) formed on a plate 40, which are disposed to have a predetermined interval d1 therebetween.

When the display panel 10 is pressed, a touch sensor immediately measures a change in capacitance caused by a decrease in an interval d2 between the touch driving electrode E1 and the touch sensing electrode E2.

Here, the touch driving electrode E1 is a component for applying a touch driving voltage, and the touch sensing electrode E2 serves to sense a change in capacitance or the like.

In order to improve touch sensitivity, it is important that the interval d1 between the touch driving electrode E1 and the touch sensing electrode E2 is maintained constantly.

FIG. 2 is a schematic view showing a touch sensing electrode according to the related art, and FIGS. 3A and 3B are schematic views showing deformation of a plate according to the related art.

As shown in FIG. 2, the touch sensing electrode E2 (see FIG. 1) of the force touch type display device 1 (see FIG. 1) may include a plurality of sensing pads S.

Here, the plurality of sensing pads S are arranged to have the same area for each region.

As shown in FIGS. 3A and 3B, the plate 40 on which the touch sensing electrode E2 (see FIG. 1) is disposed is formed with a curvature (a concave curvature (see FIG. 3A) or a convex curvature (see FIG. 3B)) in a manufacturing process.

That is, a length of a base line, which is a vertical central line of the plate 40, does not have the same value throughout the process and has a deviation. That is, there are a plurality of regions including different base lines.

As described above, there is a limitation in maintaining the interval d1 (see FIG. 1) between the touch driving electrode E1 (see FIG. 1) and the touch sensing electrode E2 (see FIG. 1) for each region constantly in the manufacturing process of the plate 40.

Therefore, a deviation is generated in the interval d1 (see FIG. 1) between the touch driving electrode E1 (see FIG. 1) and the touch sensing electrode E2 (see FIG. 1) for each region due to the curvature of the plate 40. Accordingly, a deviation is generated in capacitance of the sensing pads S (see FIG. 2) for each region and thus touch sensitivity is lowered.

SUMMARY

Accordingly, embodiments of the present disclosure are directed to a touch type display device and method for sensing touch thereof that substantially obviates one or more of the problems due to limitations and disadvantages of the related art.

An aspect of the present disclosure is to provide a touch type display device and a method for sensing a touch that can improve touch sensitivity.

Additional features and advantages of the disclosure will be set forth in the description which follows, and in part will be apparent from the description, or may be learned by practice of the disclosure. The advantages of the disclosure will be realized and attained by the structure particularly pointed out in the written description and claims as well as the appended drawings.

To achieve these and other advantages, and in accordance with the purpose of the present disclosure, as embodied and broadly described herein, a touch type display device includes a display panel which includes a first touch electrode, and a second touch electrode including a plurality of sensing pads located outside the display panel, wherein an area of each of the plurality of sensing pads is proportional to an interval between the first touch electrode and each of the plurality of sensing pads.

In another aspect, a method of sensing a touch of a touch type display device includes measuring a first capacitance between a first touch electrode and a second touch electrode before a force touch, calculating, using the first capacitance, a virtual area of each of sensing pads, wherein the virtual area makes setting intervals identical in all regions between the first touch electrode and the second touch electrode, measuring a second capacitance between the first touch electrode and the second touch electrode after the force touch, calculating an interval between the first touch electrode and the second touch electrode at a time of a touch using the second capacitance and the calculated virtual area of each of the sensing pads after the force touch, and determining whether a touch is made by using the setting interval and the interval at the time of the touch.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure, are incorporated in and constitute a part of this specification, illustrate implementations of the disclosure and together with the description serve to explain the principles of embodiments of the disclosure.

FIGS. 9A and 9B are comparison tables of a touch type display device including sensing pads according to the related art and a touch type display device including sensing pads according to an embodiment of the present disclosure.

FIGS. 10A and 10B are comparison graphs for change amounts in intervals before and after a force touch of a touch type display device including sensing pads according to the related art and a touch type display device including sensing pads according to an embodiment of the present disclosure.

DETAILED DESCRIPTION

Hereinafter, embodiments of the present disclosure will be described with reference to the accompanying drawings.

Figure 4:
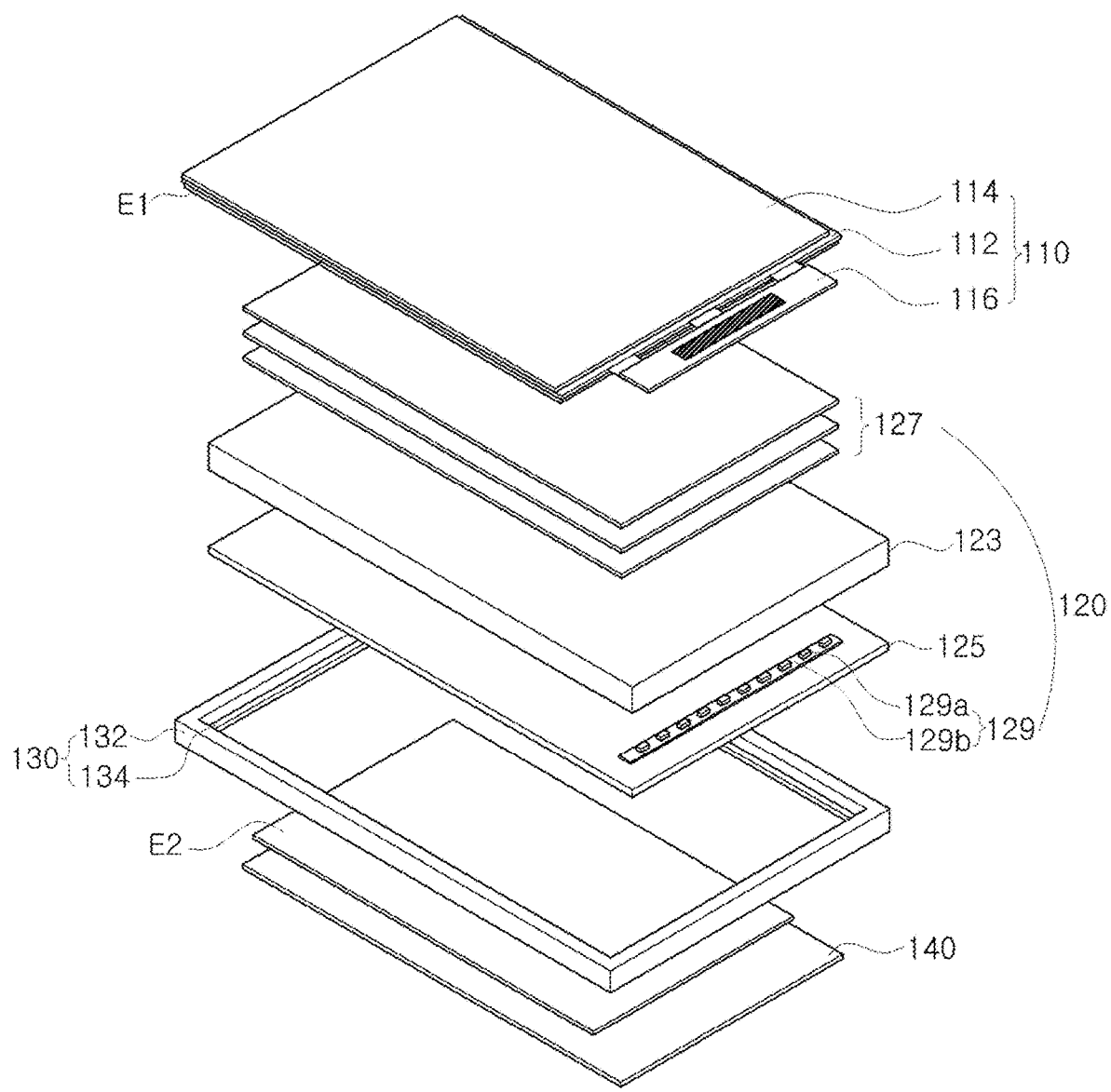
FIG. 4 is an exploded perspective view schematically showing a touch type display device to which an embodiment of the present disclosure is applied.
Figure 5:
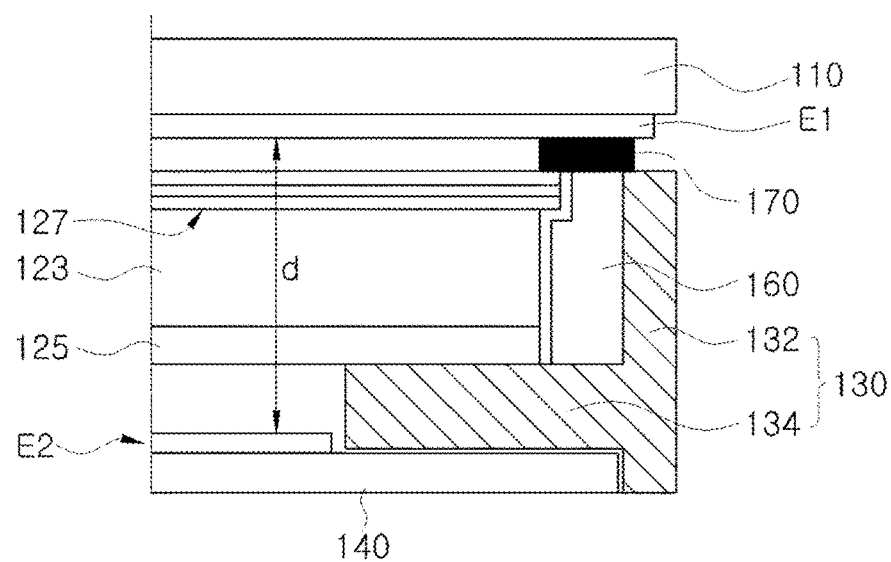
FIG. 5 is a cross-sectional view schematically showing the touch type display device to which the embodiment of the present disclosure is applied.

FIG. 4 is an exploded perspective view schematically showing a touch type display device to which an embodiment of the present disclosure is applied, and FIG. 5 is a cross-sectional view schematically showing the touch type display device to which the embodiment of the present disclosure is applied.

As shown in the drawings, a touch type display device 100 to which the embodiment of the present disclosure is applied includes a display panel 110 including a first touch electrode E1, a plate 140 disposed below the display panel 110 and including a second touch electrode E2, a backlight unit 120 disposed between the display panel 110 and the plate 140, and a rectangular guide panel 130 which surrounds side surfaces of the backlight unit 120.

Here, the display panel 110 to which the embodiment of the present disclosure is applied may include various display panels such as a liquid crystal display (LCD) panel, an electroluminescent display panel, a plasma display panel, an electrophoretic display panel, an electrowetting display panel, and the like.

Here, when the display panel 110 is an electroluminescent display panel, the display panel 110 includes a plurality of gate lines, a plurality of data lines, pixels defined by regions in which the gate lines and the data lines cross, an array substrate including a thin film transistor (TFT) which is a switching element for selectively applying an electrical signal to a light-emitting layer provided in each of the pixels, an upper protective substrate, and the like. The backlight unit 120 may be omitted.

Hereinafter, an example of a case in which the display panel 110 is a liquid crystal panel will be described.

Here, the liquid crystal panel 110 includes a first substrate 112 and a second substrate 114, which face each other and are bonded, with a liquid crystal layer (not shown) interposed therebetween.

Here, for convenience of description, directions in the drawings may be assumed that a direction of a display surface of the liquid crystal panel 110 is referred to as a forward direction or an upper direction (or an upward direction), and a direction opposite the display surface is referred to as a rearward direction or a lower direction (or a downward direction).

Although not shown in detail, pixels may be defined by a plurality of gate wirings and data wirings being crossed on an inner surface of the first substrate 112, which is referred to as a lower substrate or an array substrate, and a TFT connected to the corresponding gate wiring and data wiring and a pixel electrode connected to the TFT may be formed in each of the pixels.

Further, a color filter pattern corresponding to each of the pixels, and a black matrix which surrounds the color filter pattern and covers non-display components such as the gate wiring, the data wiring, the TFT, and the like may be formed on an inner surface of the second substrate 114, which is referred to as an upper substrate or a color filter substrate, as a facing substrate which faces the lower substrate.

In this case, any type of liquid crystal panels may be used as the liquid crystal panel 110. For example, any type of liquid crystal panels such as an in-plane switching (IPS) type liquid crystal panel, an advanced horizontal IPS (AH-IPS) type liquid crystal panel, a twisted nematic (TN) type liquid crystal panel, a vertical alignment (VA) type liquid crystal panel, an electrically controlled birefringence (ECB) type liquid crystal panel, or the like can be used. When an IPS type or AH-IPS type liquid crystal panel is used, a common electrode which forms a transverse electric field together with a pixel electrode may be formed on the first substrate 112.

Further, polarizers (not shown) through which specific light is selectively transmitted may each be attached to one of outer surfaces of the first and second substrates 112 and 114.

Further, upper and lower alignment layers (not shown), by which an initial molecular alignment direction of a liquid crystal is defined, may be interposed at interfaces between the first and second substrates 112 and 114 and the liquid crystal layer (not shown), and a seal pattern (not shown) may be formed along edges of the two substrates 112 and 114 to prevent leakage of a liquid crystal layer (not shown) with which a gap between the first and second substrates 112 and 114 is filled.

Further, first and second polarizers (not shown) through which specific light is selectively transmitted may each be attached to a corresponding one of outer surfaces of the first and second substrates 112 and 114.

A printed circuit board 116 may be connected to one edge of the liquid crystal panel 110 through a connecting member such as a flexible circuit board or a tape carrier package (TCP) and may be folded to bring into close contact with a side surface of the guide panel 130 in a modularization process.

In the liquid crystal panel 110, when a TFT selected for each gate line is turned on by an on/off signal of the TFT, which is transmitted to the gate line, an image signal of the data line is transmitted to a corresponding pixel electrode, and an alignment direction of liquid crystal molecules is changed by an electric field generated between the pixel electrode and a common electrode due to the image signal, which causes a difference in transmittance.

Specifically, the liquid crystal panel 110 of the touch type display device 100, to which the embodiment of the present disclosure is applied, may include the first touch electrode E1. For example, the first touch electrode E1 may be disposed on a back surface of the liquid crystal panel 110.

The first touch electrode E1 may be disposed between the first substrate 112 of the liquid crystal panel 110 and the first polarizer (not shown).

Here, the first touch electrode E1 may be a touch driving electrode (a transceiver: Tx) for applying a touch driving voltage.

The first touch electrode E1 may be made of a transparent conductive material. That is, the transparent conductive material may include a Zn-based oxide, an In-based oxide, or a Sn-based oxide.

For example, the first touch electrode E1 may be made of an indium tin oxide (ITO) material, but the present disclosure is not limited thereto.

The first touch electrode E1 may be connected to a touch driver (not shown).

Meanwhile, the plate 140 may be disposed below the liquid crystal panel 110 to be spaced a predetermined distance from the liquid crystal panel 110.

Further, the plate 140 may cover a lower portion of the backlight unit 120.

Here, the plate 140 may be made of a metal material, but the present disclosure is not limited thereto.

The second touch electrode E2 may be disposed on an upper surface of the plate 140.

That is, the second touch electrode E2 may be disposed between the backlight unit 120 and the plate 140.

Here, the second touch electrode E2 may be a touch sensing electrode (a receiver: Rx) for sensing a touch in a Z-axis direction, which is a force touch corresponding to a force (pressure) which is applied at a time of a touch.

The touch may refer to an action in which a user touches the liquid crystal panel 110 with a pointer. The pointer used by the user to touch a screen may be a part of a human body, such as a finger or the like, or a conductive pointer such as a pen having a contact portion as a conductor. In some cases, the pointer may be a nonconductive pointer such as a pen having a nonconductive contact portion.

The second touch electrode E2 may be made of a transparent conductive material. That is, the transparent conductive material may include a Zn-based oxide, an In-based oxide, or a Sn-based oxide.

For example, the second touch electrode E2 may be made of an ITO material, but the present disclosure is not limited thereto.

The second touch electrode E2 may be connected to the touch driver (not shown).

Figure 1A:
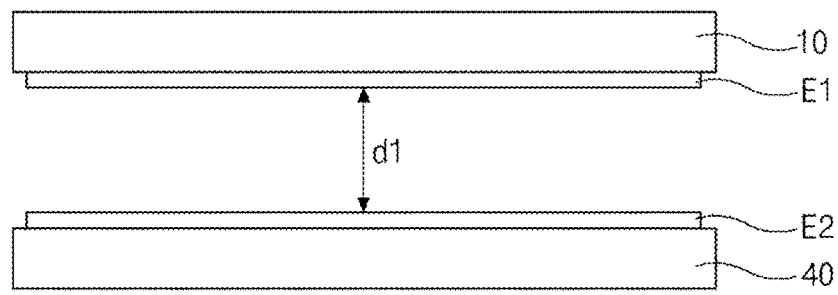
FIGS. 1A and 1B are schematic cross-sectional views showing a force touch type display device according to the related art.
Figure 1B:
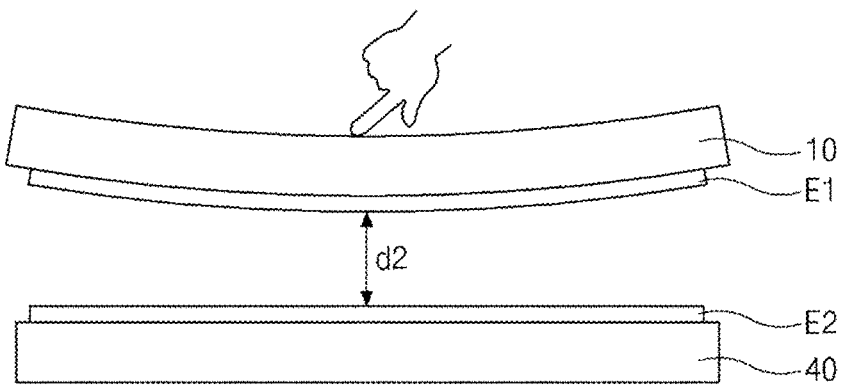
Figure 2:
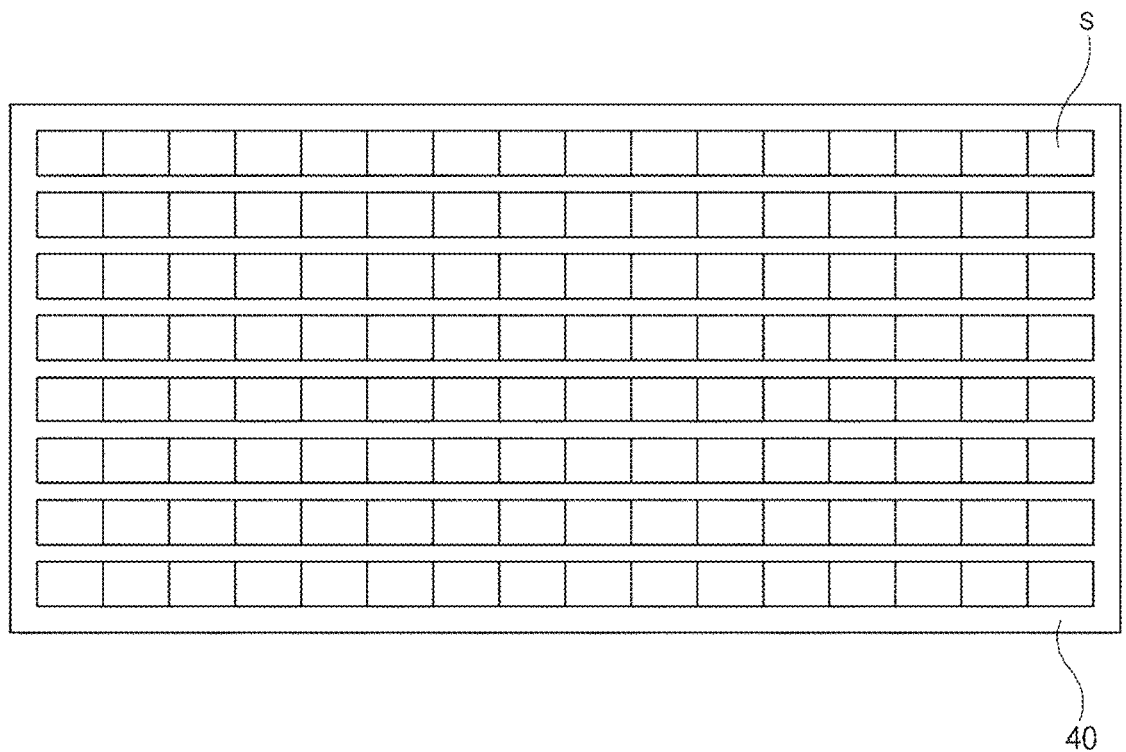
FIG. 2 is a schematic view showing a touch sensing electrode according to the related art.
Figure 3A:
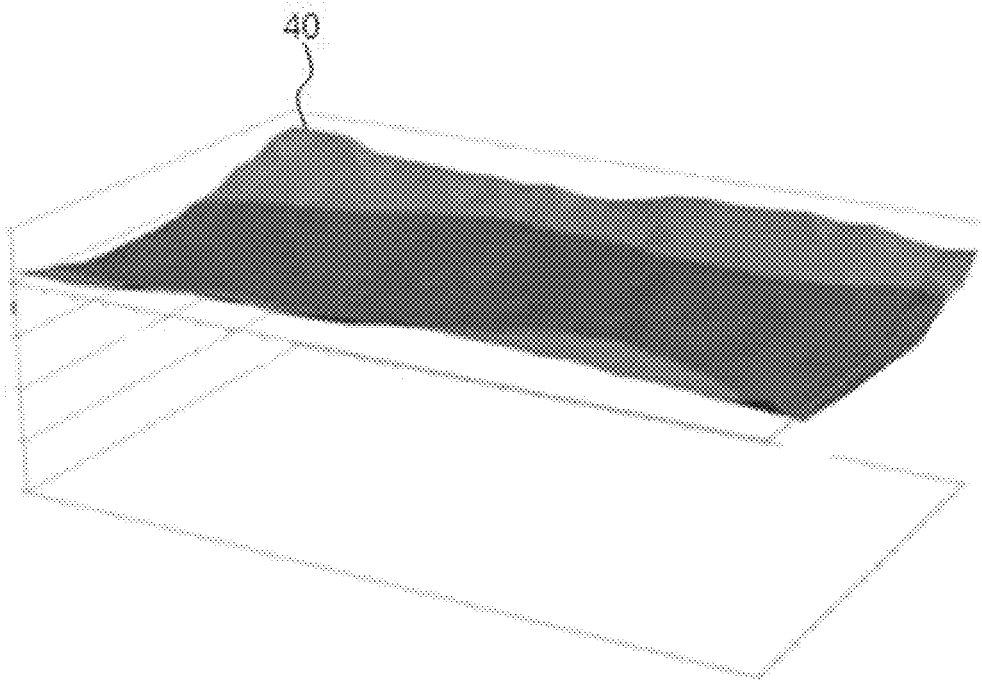
FIGS. 3A and 3B are schematic views showing deformation of a plate according to the related art.
Figure 3B:
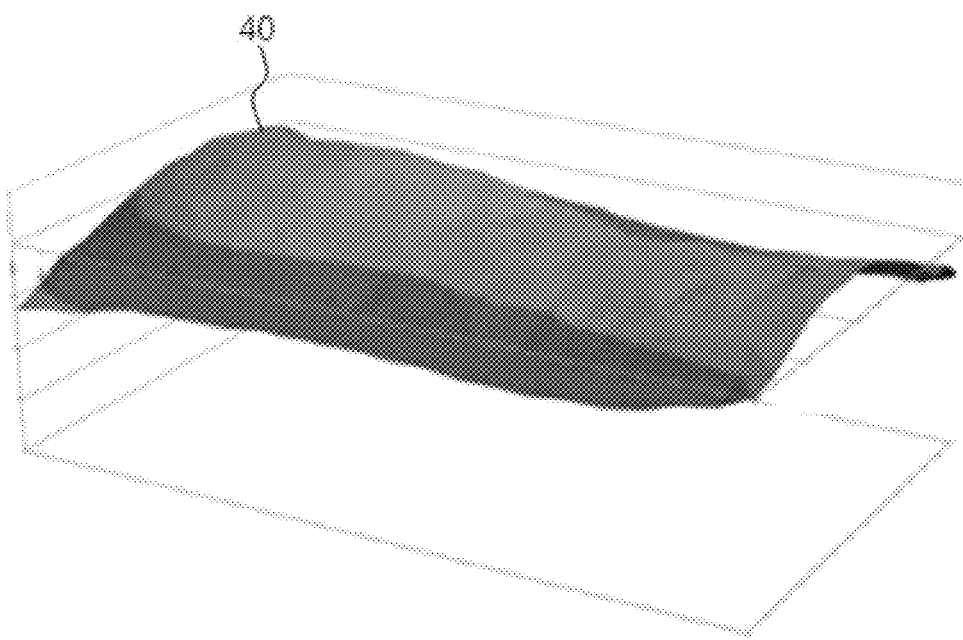

Here, the second touch electrode E2 may include the plurality of sensing pads S (see FIG. 2).

Further, an insulating layer (not shown) may be disposed between the plate 140 and the second touch electrode E2.

Specifically, the sensing pads S (see FIG. 2) of the touch type display device 100 according to the embodiment of the present disclosure may have different areas for each region.

That is, the areas of the sensing pads S (see FIG. 2) may be proportional to the interval d between the first touch electrode E1 and the sensing pads S (see FIG. 2) of the second touch electrode E2.

The areas of the sensing pads S (see FIG. 2) will be described below in more detail.

Since the second touch electrode E2 including the plurality of sensing pads S (see FIG. 2) is driven together with the first touch electrode E1, a combination of the first touch electrode E1 included in the liquid crystal panel 110 and the second touch electrode E2 formed on the upper surface of the plate 140 may be referred to as a "force sensor."

That is, a capacitance C may be generated between the first touch electrode E1 and the second touch electrode E2, and the capacitance C may vary according to a presence (magnitude) of a force touch.

That is, a relationship of $d = \varepsilon \times A / C$ comes into existence. Here, d denotes the interval between the first touch electrode E1 and the second touch electrode E2, ε denotes a dielectric constant of dielectrics between the first touch electrode E1 and the second touch electrode E2, A denotes the area of each of the sensing pads S (see FIG. 2) constituting the second touch electrode E2, and C denotes the capacitance.

Therefore, since the interval d between the first touch electrode E1 and the second touch electrode E2 is reduced and the capacitance C is increased according to the force touch, which is a touch in a Z-axis direction, corresponding to the force (pressure) which is applied at the time of the touch, the force touch, which is the touch in the Z-axis direction, may be sensed by comparing the capacitances C before and after the touch.

Meanwhile, the backlight unit 120 may be disposed between the liquid crystal panel 110 and the plate 140. Specifically, the backlight unit 120 may be disposed between the first touch electrode E1 and the second touch electrode E2.

Here, the backlight unit 120 may include a reflector 125 disposed on the second touch electrode E2, a light guide plate 123 mounted on the reflector 125, optical sheets 127 located above the light guide plate 123, and a light-emitting diode (LED) assembly 129 facing an light-incident surface of the light guide plate 123.

The LED assembly 129 is a light source of the backlight unit 120 and is located at one side of the light guide plate 123 so as to face the light-incident surface of the light guide plate 123. The LED assembly 129 may include a plurality of LEDs 129a and a PCB 129b on which the plurality of LEDs 129a are mounted to be spaced a predetermined interval from each other.

In this case, each of the plurality of LEDs 129a may emit light having red (R), green (G), or blue (B) color in a forward direction toward the light-incident surface of the light guide plate 123. White light may be realized through color mixing by turning on the plurality of RGB LEDs 129a at once.

In order to improve luminous efficiency and brightness, a blue LED 129a including a blue LED chip having high luminous efficiency and brightness may be used. A blue LED 129a made of yttrium aluminum garnet (YAG:Ce) doped with cerium, that is, a yellow phosphor, may be used as a phosphor.

Blue light emitted from the LED 129a is mixed with yellow light, which is transmitted through a phosphor and emitted by the phosphor, and thus white light is realized.

The light guide plate 123 on which the light emitted from the plurality of LEDs 129a is incident is formed such that the light incident from the LED 129a spreads evenly over a wide region of the light guide plate 123 while traveling in the light guide plate 123 by total reflection several times and provides a surface light source to the liquid crystal panel 110.

The light guide plate 123 may include a pattern having a specific shape on a lower surface thereof to supply a uniform surface light source.

Here, the pattern may be formed in various shapes such as an elliptical shape, a polygonal shape, a hologrammatic shape, and the like in order to guide the light incident into the light guide plate 123. The pattern is formed on a lower surface of the light guide plate 123 by a printing method or an injection method.

The reflector 125 is disposed on a back surface of the light guide plate 123 and reflects light transmitted through the back surface of the light guide plate 123 toward the liquid crystal panel 110 to improve the brightness of the light.

Each of the optical sheets 127 located above the light guide plate 123 includes a diffusion sheet, at least one light condensing sheet, and the like, and diffuses or condenses the light transmitted through the light guide plate 123 to make a more uniform surface light source be incident on the liquid crystal panel 110.

The liquid crystal panel 110, the backlight unit 120, and the plate 140 may be modularized using the guide panel 130.

The guide panel 130 may have a rectangular frame shape including a vertical portion 132, which surrounds the side surfaces of the backlight unit 120, and a horizontal portion 134, which supports a back edge of the reflector 125.

Here, the horizontal portion 134 may be disposed between the reflector 125 and the plate 140.

Further, a light guide plate holder 160 may be disposed between the light guide plate 123 and the vertical portion 132 of the guide panel 130.

Here, lateral movement of the light guide plate 123 may be prevented by the light guide plate holder 160.

The back edge of the liquid crystal panel 110 is bonded onto the backlight unit 120 by a ring tape 170 such as a double-sided tape so that the liquid crystal panel 110 may be fixed and supported by the ring tape 170.

That is, the optical sheets 127, the light guide plate holder 160, and the vertical portion 132 of the guide panel 130 are in contact with a back surface of the ring tape 170 and the liquid crystal panel 110 is in contact with an upper surface of the ring tape 170 so that the backlight unit 120 and the liquid crystal panel 110 may be fixed and supported by the ring tape 170.

Further, a cover glass (not shown) for protecting a liquid crystal panel may be disposed on an upper surface of the liquid crystal panel 110.

As described above, the touch type display device 100 according to the embodiment of the present disclosure may be configured without a separate case top which surrounds a front edge of the liquid crystal panel 110. As described above, when the display panel 110 is configured to be directly exposed to the outside without the case top, the touch type display device 100 has an advantage in that it may have a beautiful appearance and may also have a larger area to be recognized by a user.

Figure 6:
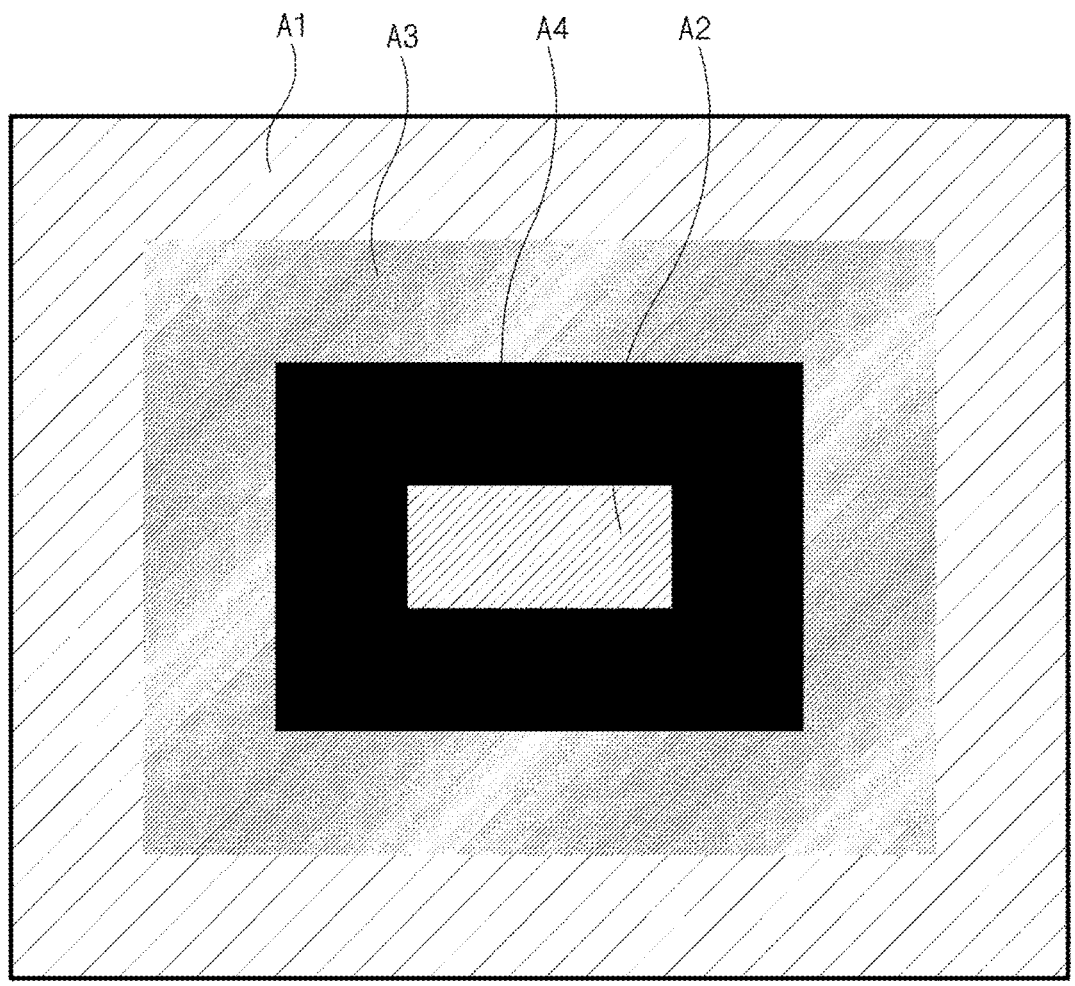
FIG. 6 is a view for describing an interval between a first touch electrode and a second touch electrode for each region.
Figure 7:
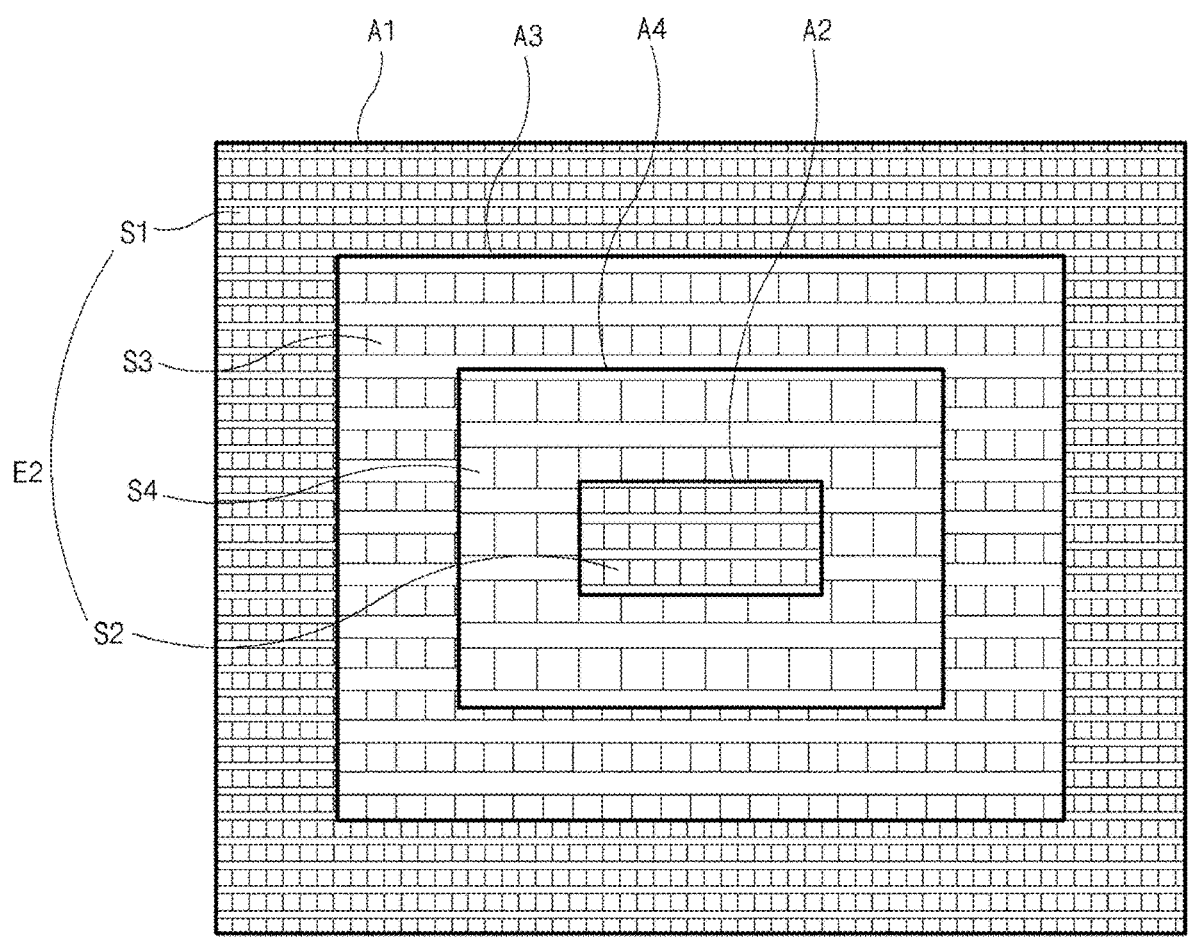
FIG. 7 is a schematic view showing sensing pads of the second touch electrode disposed for each region of FIG. 6.

FIG. 6 is a view for describing the interval between the first touch electrode and the second touch electrode for each region, and FIG. 7 is a schematic view showing the sensing pads of the second touch electrode disposed for each region of FIG. 6.

As shown in FIG. 6, a length of the base line of the plate 140 (see FIG. 5) does not have the same value in all the regions in the process, and has a deviation. That is, there are a plurality of regions A1, A2, A3, and A4 having different base lines.

Therefore, the first touch electrode E1 (see FIG. 5) included in the liquid crystal panel 110 (see FIG. 5) and the sensing pads S1, S2, S3, and S4 of the second touch electrode E2 disposed on the upper surface of the plate 140 (see FIG. 5) have different intervals d (see FIG. 5) for each of the regions A1, A2, A3, and A4.

For example, a first region A1 may have a first interval d1, a second region A2 may have a second interval d2, a third region A3 may have a third interval d3, and a fourth region A4 may have a fourth interval d4. The intervals d (see FIG. 5) may have a relationship of the first interval d1<the second interval d2<the third interval d3<the fourth interval d4.

Therefore, when the sensing pads S having the same area are disposed for each of the regions A1, A2, A3, and A4 as in the related art, the capacitances C formed for each of the regions A1, A2, A3, and A4 before the touch are varied according to the relationship of $d=\varepsilon \times A/C$ (here, d denotes the interval between the first touch electrode and the second touch electrode, E denotes the dielectric constant of the dielectrics between the first touch electrode E1 and the second touch electrode E2, A denotes the area of each of the sensing pads constituting the second touch electrode, and C denotes the capacitance).

Accordingly, degradation of the performance of the touch type display device 100 (see FIG. 5) which is operated by sensing a change (pressure) in interval between the first touch electrode E1 and the second touch electrode E2 occurs.

For example, a change amount in capacitance before and after the touch also varies for each region due to the different capacitances C before the touch, and thus a threshold value of touch sensitivity for noise removal is increased and the touch sensitivity is lowered.

On the other hand, as shown in FIG. 7 according to the present disclosure, the sensing pads S1, S2, S3, and S4 which have different areas for each of the regions A1, A2, A3, and A4 may be disposed in proportion to the interval d (see FIG. 5) between the first touch electrode E1 (see FIG. 5) and the second touch electrode E2.

For example, when the first region A1 has the first interval d1, the second region A2 has the second interval d2, the third region A3 has the third interval d3, the fourth region A4 has the fourth interval d4, and the intervals d (see FIG. 5) have a relationship of the first interval d1<the second interval d2<the third interval d3<the fourth interval d4, the area of the second sensing pad S2 disposed in the second region A2 may be greater than the area of the first sensing pad S1 disposed in the first region A1.

Further, the area of the third sensing pad S3 disposed in the third region A3 may be greater than the area of the second sensing pad S2 disposed in the second region A2.

Further, the area of the fourth sensing pad S4 disposed in the fourth region A4 may be greater than the area of the third sensing pad S3 disposed in the third region A3.

As described above, since the areas of the sensing pads S1, S2, S3, and S4 are different for each of the regions A1, A2, A3, and A4 in proportion to the interval d (see FIG. 5) between the first touch electrode E1 (see FIG. 5) and the sensing pads S1, S2, S3, and S4, all the regions A1, A2, A3, and A4 may have a uniform capacitance regardless of differences of the intervals d (see FIG. 5) between the first touch electrode E1 (see FIG. 5) and the sensing pads S1, S2, S3, and S4 of the second touch electrode E2 (see FIG. 5) for each of the regions A1, A2, A3, and A4 due to curling or bending of the plate 140 (see FIG. 5). Therefore, the threshold value of touch sensitivity may be decreased, the noise may be minimized, and the touch sensitivity may be improved.

Meanwhile, the division of the first to fourth regions A1, A2, A3, and A4 is an example, and the regions may be divided into various regions according to the type, size, and the like of the display device.

Here, the intervals d between the first touch electrode E1 (see FIG. 5) and the sensing pads S1, S2, S3, and S4 for each of the regions A1, A2, A3, and A4 may be calculated by measuring the capacitances of the first touch electrode E1 (see FIG. 5) and the second touch electrode E2 for each of the regions A1, A2, A3, and A4 before the touch. The areas of the sensing pads S1, S2, S3, and S4 may be designed using the calculated intervals d (see FIG. 5) between the first touch electrode E1 (see FIG. 5) and the second touch electrode E2 for each of the regions A1, A2, A3, and A4 and the measured capacitances.

The number of the sensing pads S1, S2, S3, and S4 may be designed to be 96 (8×12), but the present disclosure is not limited thereto. The number of the sensing pads S1, S2, S3, and S4 may vary according to the type, size, and the like of the display device.

Figure 8:
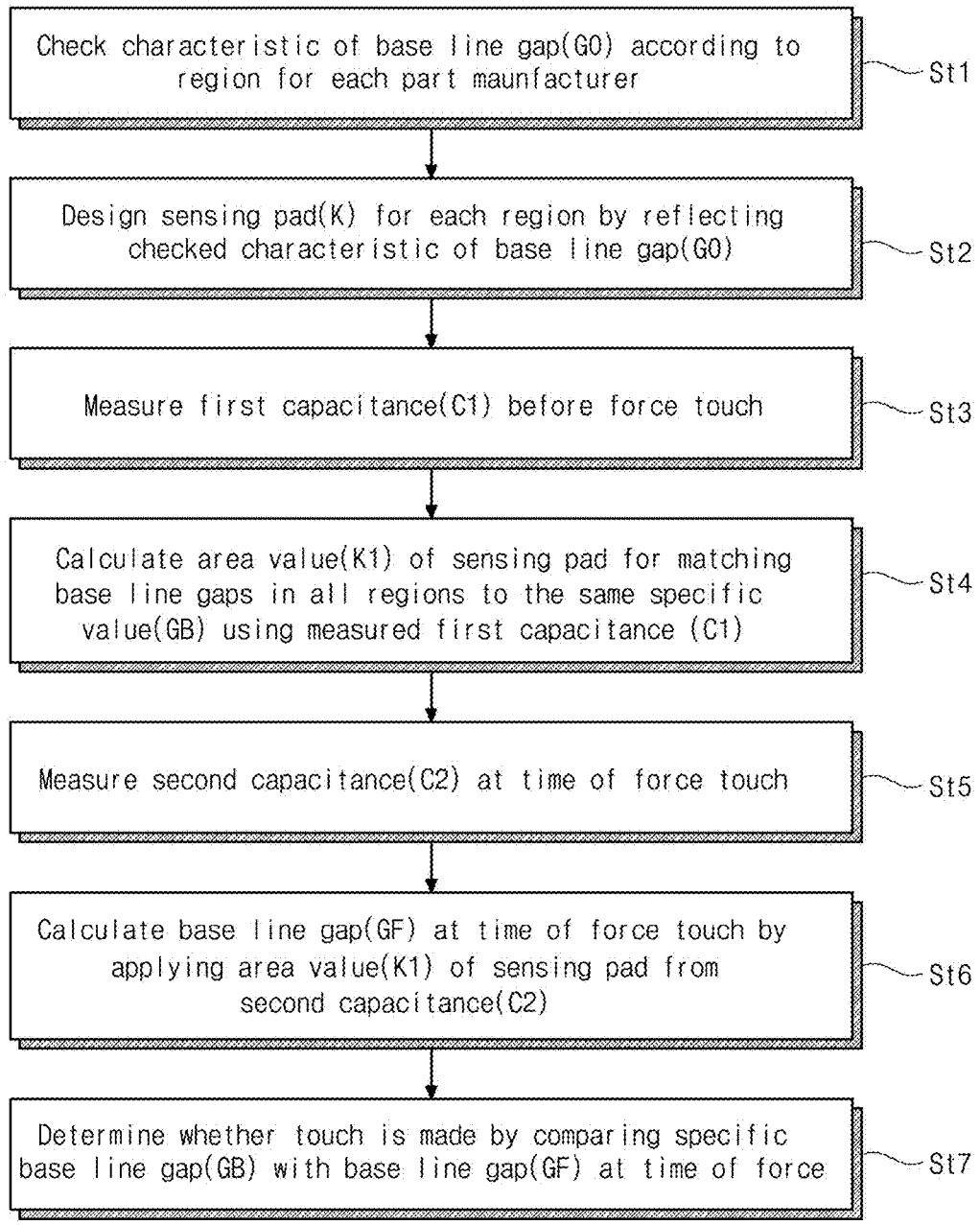
FIG. 8 is a flowchart for describing a method of sensing a touch of a touch type display device according to an embodiment of the present disclosure.

FIG. 8 is a flowchart for describing a method of sensing a touch of the touch type display device according to the embodiment of the present disclosure. The method of sensing a touch of the touch type display device will be described with reference to FIGS. 5 and 7.

As shown in FIG. 8, a characteristic of a gap G0 of a base line, which is a vertical center line of a plate 140 for each part manufacturer, is checked (St1).

A plurality of plates 140 may be measured to define an average value thereof as a characteristic value.

For example, the interval d (see FIG. 5) between the first touch electrode E1 (see FIG. 5) and the second touch electrode E2 (see FIG. 5) for each of the regions A1, A2, A3, and A4 (see FIG. 7) of the touch type display device 100 (see FIG. 5) may be defined as the base line gap G0. That is, the intervals d (see FIG. 5) between the plurality of sensing pads S1, S2, S3, and S4 (see FIG. 7) constituting the second touch electrode E2 (see FIG. 5) and the first touch electrode E1 (see FIG. 5) are measured for each of the regions A1, A2, A3, and A4 (see FIG. 7).

Here, the intervals d (see FIG. 5) between the first touch electrode E1 (see FIG. 5) and the sensing pads S1, S2, S3, and S4 (see FIG. 7) of the second touch electrode E2 (see FIG. 5) for each of the regions A1, A2, A3, and A4 (see FIG. 7) before the touch may be calculated by measuring the capacitance of the first touch electrode E1 (see FIG. 5) and the capacitances of the sensing pads S1, S2, S3, and S4 (see FIG. 7) for each of the regions A1, A2, A3, and A4 (see FIG. 7).

When the capacitance of the first touch electrode E1 (see FIG. 5) and the capacitances of the sensing pads S1, S2, S3, and S4 (see FIG. 7) for each of the regions A1, A2, A3, and A4 (see FIG. 7) are measured before the touch in order to calculate the intervals d (see FIG. 5), the areas of the sensing pads S1, S2, S3, and S4 (see FIG. 7) may have the same area for each of the regions A1, A2, A3, and A4 (see FIG. 7).

Next, a sensing pad A0 is designed for each region by reflecting the checked characteristic of the base line gap G0 (St2).

That is, an area K of each of the plurality of sensing pads S1, S2, S3, and S4 (see FIG. 7) included in the second touch electrode E2 (see FIG. 5) is designed in proportion to the measured intervals d (see FIG. 5) for each of the regions A1, A2, A3, and A4 (see FIG. 7).

Next, a first capacitance C1 between the first touch electrode E1 (see FIG. 5) and the second touch electrode E2 (see FIG. 5) is measured before a force touch (St3).

In this case, the designed area K is applied to each of the plurality of sensing pads S1, S2, S3, and S4 (see FIG. 7) included in the second touch electrode E2 (see FIG. 5).

Further, a value K1 of a virtual area of each of the sensing pads S1, S2, S3, and S4 (see FIG. 7) which makes setting intervals GB identical in all the regions A1, A2, A3, and A4 (see FIG. 7) between the first touch electrode E1 (see FIG. 5) and the second touch electrode E2 (see FIG. 5) is calculated using the first capacitance C1 (St4).

That is, it is assumed from the first touch electrode E1 (see FIG. 5) that the sensing pads S1, S2, S3, and S4 (see FIG. 7) in all the regions A1, A2, A3, and A4 (see FIG. 7) are arranged with the same setting interval GB (an arbitrary constant). Before the force touch, the value K1 of the virtual area of each of the sensing pads S1, S2, S3, and S4 (see FIG. 7) which makes setting intervals GB of the sensing pads S1, S2, S3, and S4 (see FIG. 7) in all the regions A1, A2, A3, and A4 (see FIG. 7) identical is calculated using the calculated first capacitance C1 between the first touch electrode E1 (see FIG. 5) and the second touch electrode E2 (see FIG. 5).

Next, after the force touch, a second capacitance C2 between the first touch electrode E1 (see FIG. 5) and the second touch electrode E2 (see FIG. 5) is measured (St5).

That is, the first interval GB between the first touch electrode E1 (see FIG. 5) and the second touch electrode E2 (see FIG. 5) is reduced according to the force touch corresponding to the force (pressure) which is applied at the time of the touch. Accordingly, the increased second capacitance C2 is measured for each of the regions A1, A2, A3, and A4 (see FIG. 7).

Next, a second interval GF between the first touch electrode E1 (see FIG. 5) and the second touch electrode E2 (see FIG. 5) after the force touch is calculated using the measured second capacitance C2 and the calculated value K1 of the virtual area of each of the sensing pads S1, S2, S3, and S4 (see FIG. 7) (St6).

For example, when it is assumed that the first touch electrode E1 (see FIG. 5) and the sensing pads S1, S2, S3, and S4 (see FIG. 7) for each of the regions A1, A2, A3, and A4 (see FIG. 7) have the same setting interval GB of 680 µm in all the regions A1, A2, A3, and A4 (see FIG. 7), the interval GF between the first touch electrode E1 (see FIG. 5) and the second touch electrode E2 (see FIG. 5) at the time of the touch may be calculated using the value K1 of the virtual area calculated from the setting interval GB of 680 µm and the measured second capacitance C2.

Next, a change amount GBF of the interval d between the first touch electrode E1 (see FIG. 5) and the second touch electrode E2 (see FIG. 5) before and after the force touch is calculated using the setting interval GB and the interval GF at the time of the touch (St7).

Further, it is determined whether the touch is made by using the change amount GBF of the interval d between the first touch electrode E1 (see FIG. 5) and the second touch electrode E2 (see FIG. 5) before and after the force touch.

For example, the change amount GBF of the interval may be calculated using an equation of the interval GF at the time of the touch–the setting interval GB=the change amount GBF of the interval.

Using the above operations, the change amount GBF of the interval d for each region before and after the touch is uniformly adjusted. Therefore, a malfunction caused by the touch may be significantly reduced and touch sensitivity may be improved.

FIGS. 9A and 9B are comparison tables of a touch type display device including sensing pads according to the related art and a touch type display device including sensing pads according to an embodiment of the present disclosure. FIGS. 10A and 10B are comparison graphs for change amounts in intervals before and after a force touch of a touch type display device including sensing pads according to the related art and a touch type display device including sensing pads according to an embodiment of the present disclosure. The following description will be given with further reference to FIGS. 6 and 7.

Referring again to FIGS. 6 and 7, the first touch electrode E1 (see FIG. 5) included in the liquid crystal panel 110 (see FIG. 5) and the sensing pads S1, S2, S3, and S4 of the second touch electrode E2 (see FIG. 5) disposed on the upper surface of the plate 140 (see FIG. 5) have different intervals for each of the regions A1, A2, A3, and A4.

For example, the first region A1 may have the first interval, the second region A2 may have the second interval, the third region A3 may have the third interval, and the fourth region A4 may have the fourth interval.

Here, an example in which the first interval d1 is 620 µm, the second interval d2 is 660 µm, the third interval d3 is 700 µm, and the fourth interval d4 is 740 µm will be described.

As shown in FIG. 9A, when the sensing pads S1, S2, S3, and S4 having the same area (K=20,000 µm$^2$) are arranged in the first to fourth regions A1, A2, A3, and A4 having different gaps (or intervals) G0, a relatively large deviation is generated in the capacitance C1 before the force touch for each of the regions A1, A2, A3, and A4.

Here, the capacitance C1 is represented by the number (count) of clocks for measuring a delay time. Since $\tau$=RC, the number of clocks is a value proportional to the capacitance C1.

As described above, the first to fourth regions A1, A2, A3, and A4 having different first intervals GB are present because the capacitance C1 before the force touch is not uniform.

Accordingly, the capacitance C2 after the force touch (assuming that a touch is generated in each portion) and the second interval GF calculated from the capacitance C2 after the force touch appear differently in the first to fourth regions A1, A2, A3, and A4.

Therefore, a relatively large deviation is generated in the change amount GBF of the interval before and after the touch for each of the first to fourth regions A1, A2, A3, and A4.

Here, referring to FIG. 10A, when a threshold value W of touch sensitivity is set to 220, a malfunction caused by the touch in which the first region A1, in which the change amount GBF of the interval before and after the touch is 199, cannot be recognized occurs. Therefore, the malfunction causes a decrease in the touch sensitivity.

On the other hand, as shown in FIG. 9B, in the touch type display device according to the embodiment of the present disclosure, the sensing pads S1, S2, S3, and S4, which are proportional to an interval G0, may be disposed in the first to fourth regions A1, A2, A3, and A4, respectively.

That is, the sensing pads S1 having an area K of 19,000 µm$^2$ may be disposed in the first region A1, the sensing pads S2 having an area K of 21,000 µm$^2$ may be disposed in the second region A2, the sensing pads S3 having an area K of 22,000 µm$^2$ may be disposed in the third region A3, the sensing pads S4 having and an area K of 23,000 µm$^2$ may be disposed in the fourth region A4.

Accordingly, it is possible to theoretically uniformly generate capacitances C1 for each region before the force touch. Here, the capacitance C1 is represented by the number (count) of clocks for measuring a delay time. Since $\tau$=RC, the number of clocks is a value proportional to the capacitance C1.

Further, the actual intervals G0 are different even when the capacitances C1 are similar. However, since the touch sensitivity is improved when the intervals G0 are the same, the same setting interval GB is set in all the regions.

In this case, the value K1 of the virtual area of each of the sensing pads may be calculated using the capacitances C1 and the setting interval GB.

Accordingly, the first to fourth regions A1, A2, A3, and A4 may be set to have the same base line GB.

Further, for example, the capacitance C2 (=C1+10000) having a value larger than that of the force touch capacitance C1 after the force touch is measured, and the interval GF at the time of the touch is calculated using the capacitance C2 and the value K1 of the virtual area after the force touch. Here, a relatively small deviation is generated in the interval GF at the time of the touch in the first to fourth regions A1, A2, A3, and A4.

Therefore, a relatively small deviation is generated in the change amount GBF in interval before and after the touch in the first to fourth regions A1, A2, A3, and A4.

Here, referring to FIG. 10B, since the change amounts GBF in interval before and after the touch in the first to fourth regions A1, A2, A3, and A4 all have a value of 220 or more when the threshold value W of the touch sensitivity is set to 220, all the touches in the first to fourth regions A1, A2, A3, and A4 may be recognized. That is, the touch sensitivity may be effectively improved.

In the touch type display device according to the embodiment of the present disclosure, since a cross-sectional area of each of the sensing pads in each region is proportional to the interval between the first touch electrode and the sensing pads, all the regions may have a uniform capacitance regardless of differences of the intervals between the first touch electrode and the sensing pads for each region due to curling or bending of the plate. Therefore, touch sensitivity may be effectively improved.

An area of a sensing pad is set to be different in proportion to an interval between a first touch electrode and a second touch electrode, and thus uniformity of a capacitance for each region can be increased and touch sensitivity can be effectively improved.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch type display device comprising:
a display panel including a first touch electrode; and
a second touch electrode including a plurality of sensing pads that are located outside the display panel,
wherein an area of each of the plurality of sensing pads is proportional to an interval between the first touch electrode and each of the plurality of sensing pads before a time of a touch, and
wherein the touch type of the display device is a capacitive type.

2. The touch type display device of claim 1, wherein the first and second touch electrodes are used as a force sensor which allow a vertical load or a pressure, which is caused by a touch input to the display panel, to be measured.

3. The touch type display device of claim 2, further comprising a plate disposed below the display panel,
wherein the second touch electrode is disposed on an upper surface of the plate.

4. The touch type display device of claim 3, further comprising:
a cover glass disposed above the display panel; and
a backlight unit disposed between the display panel and the second touch electrode.

5. A method of sensing a touch of a touch type display device, the method comprising:
measuring a first capacitance between a first touch electrode and a second touch electrode before a force touch;
calculating, using the first capacitance, a virtual area of each of sensing pads, wherein the virtual area makes setting intervals identical in all regions between the first touch electrode and the second touch electrode;
measuring a second capacitance between the first touch electrode and the second touch electrode after the force touch;
calculating an interval between the first touch electrode and the second touch electrode at a time of a touch using the second capacitance and the calculated virtual area of each of the sensing pads after the force touch; and
determining whether a touch is made by using the setting interval and the interval at the time of the touch.

6. The method of claim 5, wherein measuring the first capacitance between the first touch electrode and the second touch electrode before the force touch includes:
measuring the interval between the first touch electrode and the second touch electrode of the touch type display device for each region; and
calculating an area of each of the sensing pads included in the second touch electrode in proportion to the interval.

7. The method of claim 5, wherein determining whether the touch is made by using the setting interval and the interval at the time of the touch includes calculating a change amount in the interval between the first touch electrode and the second touch electrode before and after the force touch using the setting interval and the interval at the time of the touch.

8. The method of claim 5, wherein the sensing pads have different areas in proportion to the interval between the first touch electrode and each of the sensing pads.

9. The touch type display device of claim 1, wherein the touch type display device is configured to:
calculate an interval between the first touch electrode and the second touch electrode at a time of a user's touch using a second capacitance between the first touch electrode and the second touch electrode after a force touch and a virtual area of each of the plurality of sensing pads; and
determine whether a touch is made by using a setting interval and the interval at the time of the user's touch, and
wherein the virtual area of each of the plurality of sensing pads is calculated using a first capacitance between the first touch electrode and the second touch electrode before the force touch and makes the setting interval identical in all regions between the first touch electrode and the second touch electrode.

10. The touch type display device of claim 9, wherein whether the touch is made is determined by using a change amount between the setting interval and the interval at the time of the user's touch.

* * * * *